United States Patent
Zhu (10) Patent No.: US 12,301,484 B2
(45) Date of Patent: May 13, 2025

(54) METHOD AND DEVICE FOR CARRIER AGGREGATION, COMMUNICATION APPARATUS, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 535 days.

(21) Appl. No.: 17/595,701

(22) PCT Filed: May 24, 2019

(86) PCT No.: PCT/CN2019/088428
§ 371 (c)(1),
(2) Date: Nov. 22, 2021

(87) PCT Pub. No.: WO2020/237443
PCT Pub. Date: Dec. 3, 2020

(65) Prior Publication Data
US 2022/0216957 A1 Jul. 7, 2022

(51) Int. Cl.
*H04L 5/00* (2006.01)
*H04W 24/10* (2009.01)
*H04W 72/0453* (2023.01)

(52) U.S. Cl.
CPC ............ *H04L 5/003* (2013.01); *H04W 24/10* (2013.01); *H04W 72/0453* (2013.01)

(58) Field of Classification Search
CPC ....... H04L 5/003; H04L 5/001; H04L 5/0094; H04W 24/10; H04W 72/0453; H04W 24/08; H04W 74/0808
See application file for complete search history.

(56) References Cited

U.S. PATENT DOCUMENTS

| | | | |
|---|---|---|---|
| 10,938,609 B2* | 3/2021 | Kazmi | H04L 27/26025 |
| 11,381,979 B2* | 7/2022 | Richards | H04L 5/0032 |
| 11,711,109 B2* | 7/2023 | Liu | H04L 5/0012 370/330 |
| 11,818,579 B2* | 11/2023 | Kolekar | H04W 8/02 |
| 12,028,884 B2* | 7/2024 | Panteleev | H04W 72/0453 |

(Continued)

FOREIGN PATENT DOCUMENTS

| | | |
|---|---|---|
| CN | 102843696 A | 12/2012 |
| CN | 104683080 A | 6/2015 |

(Continued)

OTHER PUBLICATIONS

ISA China National Intellectual Property Administration, International Search Report Issued in Application No. PCT/CN2019/088428, Feb. 27, 2020, WIPO, 4 pages.

(Continued)

*Primary Examiner* — Brian T O Connor
(74) *Attorney, Agent, or Firm* — McCoy Russell LLP (57) ABSTRACT

Examples of the present application disclose a method and device for carrier aggregation, a communication apparatus, and a storage medium. The method for carrier aggregation comprises: determining a main carrier for performing carrier aggregation on an unlicensed frequency band; and triggering the implementation of carrier aggregation on the main carrier.

18 Claims, 6 Drawing Sheets

(56) References Cited

U.S. PATENT DOCUMENTS

| | | | |
|---|---|---|---|
| 12,041,609 B2* | 7/2024 | He | H04W 72/0446 |
| 12,101,763 B2* | 9/2024 | Islam | H04W 72/23 |
| 2015/0065152 A1 | 3/2015 | Sadek et al. | |
| 2016/0338019 A1* | 11/2016 | Ratasuk | H04L 5/006 |
| 2018/0199308 A1* | 7/2018 | Liu | H04W 68/02 |
| 2018/0235007 A1* | 8/2018 | Gou | H04W 74/0808 |
| 2020/0053546 A1 | 2/2020 | Panchal et al. | |
| 2021/0314796 A1* | 10/2021 | Hoang | H04W 24/08 |
| 2021/0360693 A9* | 11/2021 | Iyer | H04L 5/001 |
| 2022/0086824 A1* | 3/2022 | Kundu | H04L 5/0053 |
| 2022/0116969 A1* | 4/2022 | He | H04W 72/1273 |
| 2022/0124542 A1* | 4/2022 | Li | H04W 88/085 |
| 2022/0191858 A1* | 6/2022 | Cui | H04L 5/0053 |
| 2022/0201751 A1* | 6/2022 | Loehr | H04W 72/23 |

FOREIGN PATENT DOCUMENTS

| | | |
|---|---|---|
| CN | 106452701 A | 2/2017 |
| CN | 106452708 A | 2/2017 |
| CN | 107026723 A | 8/2017 |
| CN | 107171773 A | 9/2017 |
| CN | 109728887 A | 5/2019 |
| WO | 2015116159 A1 | 8/2015 |
| WO | 2017133596 A1 | 8/2017 |
| WO | 2017190269 A1 | 11/2017 |
| WO | 2019058208 A1 | 3/2019 |

OTHER PUBLICATIONS

"Measurement Events in Carrier Aggregation," Proceedings of the 3GPP TSG-RAN WG2 Meeting #69bis, Nokia Siemens Networks, Nokia Corporation, R2-102098, Apr. 12, 2010, Beijing, China, 6 pages.

Yashoda, B. et al., "Improving the Efficiency of LTE-MIMO Performance by Utilizing Carrier Aggregation Method," Proceedings of the 2015 International Conference on Emerging Research in Electronics, Computer Science and Technology (ICERECT), Dec. 17, 2015, Mandya, India, 7 pages.

Wang, S., "Design and Implementation of MAC Layer Downlink Carrier Aggregation in LTE-Advanced Terminal Testing Instrument," China Master's Thesis Full-text Database Information Technology Series, Jan. 20, 2016, 79 pages. (Submitted with English Abstract).

"3rd Generation Partnership Project; Technical Specification Group Radio Access Network; Study on Licensed-Assisted Access to Unlicensed Spectrum; (Release 13)," 3GPP TR 36.889, V0.4.2, R2-152892, May 2015, 66 pages.

"Introduction of enhancements for eMTC excluding EDT," Proceedings of the 3GPP TSG-RAN2 Meeting #102, Ericsson, R2-1809253, May 21, 2018, Busan, Republic of Korea, 29 pages.

* cited by examiner

METHOD AND DEVICE FOR CARRIER AGGREGATION, COMMUNICATION APPARATUS, AND STORAGE MEDIUM

CROSS REFERENCE TO RELATED APPLICATION

The present application is a U.S. National Phase of International Application No. PCT/CN2019/088428 entitled "CARRIER AGGREGATION METHOD AND DEVICE, COMMUNICATION APPARATUS, AND STORAGE MEDIUM," and filed on May 24, 2019. The entire contents of the above-listed application is hereby incorporated by reference for all purposes.

TECHNICAL FIELD

The present application relates to the field of wireless communication but is not limited to the field of wireless communication, and to a method and device for carrier aggregation, a communication apparatus, and a storage medium.

BACKGROUND

In the field of wireless communication technologies, in order to improve transmission rate, communication capacity and the like, a carrier aggregation technology is introduced. Through aggregated transmission of multiple carriers, the transmission rate and the communication capacity of a system can be improved. However, in related carrier aggregation technologies, there are problems such as poor effect of carrier aggregation, or failure to implement carrier aggregation.

SUMMARY

Examples of the present application disclose a method for carrier aggregation, a communication apparatus, and a storage medium.

At least one example of the present application provides a method for carrier aggregation, including:
   determining a primary carrier for performing carrier aggregation on an unlicensed frequency band; and
   triggering implementation of carrier aggregation on the primary carrier.

At least one example of the present application provides a communication apparatus, including:
   an antenna;
   a memory; and
   a processor, configured to connect with the antenna and the memory respectively, and to control the antenna to send and receive wireless signals by executing an executable program stored on the memory, and to implement steps of the method for carrier aggregation provided by any above-mentioned example.

At least one example of the present application provides a non-transitory computer-readable storage medium, having an executable program stored thereon. When the executable program is executed by a processor, steps of the method for carrier aggregation provided by any above-mentioned example are implemented.

DETAILED DESCRIPTION

Examples will be described in detail herein, which are illustrated in the accompanying drawings. When the following description refers to the accompanying drawings, the same numbers in different drawings represent the same or similar elements unless otherwise indicated. The implementations described in the following examples do not represent all implementations consistent with the disclosure. On the contrary, they are merely examples of devices and methods consistent with some aspects of the disclosure.

Terms used in the examples of the disclosure are only for the purpose of describing specific examples, and are not intended to limit the examples of the disclosure. The singular forms of "a", "said" and "the" used in the examples of the disclosure are also intended to include plural forms, unless the context clearly indicates other meanings. It should also be understood that the term "and/or" as used herein refers to and includes any or all possible combinations of one or more associated listed items.

It should be understood that although the terms first, second, third, etc. may be used to describe various information in the examples of the disclosure, the information should not be limited to these terms. These terms are only used to distinguish the same type of information from each other. For example, without departing from the scope of the examples of the disclosure, first information may also be referred to as second information, and similarly, the second information may also be referred to as the first information. Depending on the context, the words "if" and "in case" as used herein may be interpreted as "when" or "as" or "in response to certainty".

Figure 1:
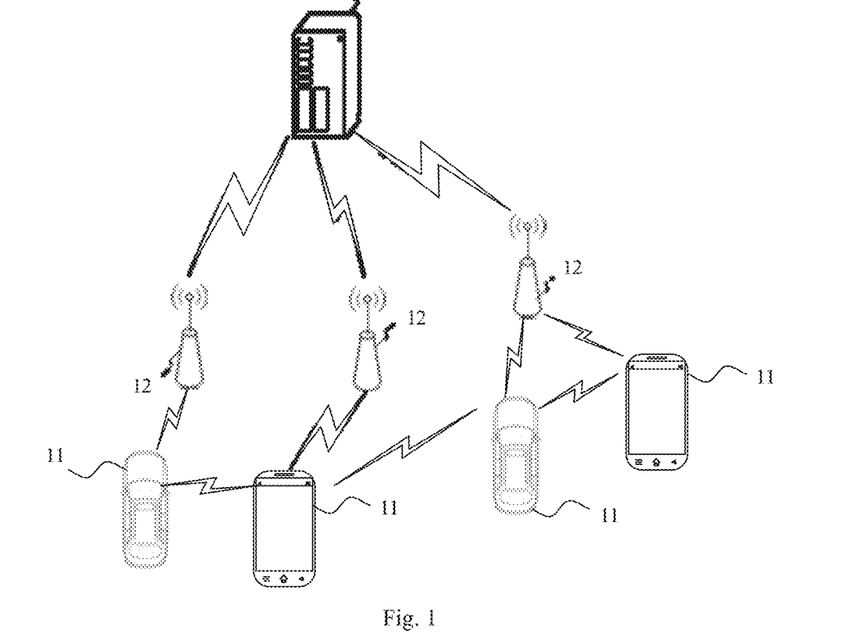
FIG. 1 is a schematic structural diagram of a wireless communication system provided by an example of the present application.

Please refer to FIG. 1, which shows a schematic structural diagram of a wireless communication system provided by an example of the disclosure. As shown in FIG. 1, the wireless communication system is a communication system based on a cellular mobile communication technology. The wireless communication system may include a plurality of terminals 11 and a plurality of base stations 12.

The terminals 11 may be apparatuses that provide voice and/or data connectivity for a user. The terminals 11 may communicate with one or more core networks via a radio access network (RAN). The terminals 11 may be Internet of Things terminals, such as sensor devices, mobile phones (or "cellular" phones), and computers with the Internet of Things terminals, for example, may be fixed, portable, pocket-sized, handheld, computer built-in, or on-board devices, for example, a station (STA), a subscriber unit, a subscriber station, a mobile station, a mobile, a remote station, an access point, a remote terminal, an access terminal, a user terminal, a user agent, a user device, or user equipment (UE). Or, the terminals 11 may also be apparatuses of unmanned aircrafts. Or, the terminals 11 may also be on-board apparatuses, for example, may be trip computers with a wireless communication function, or a wireless communication apparatus externally connected to the trip computer. Or, the terminals 11 may also be roadside apparatuses, for example, may be a street lamp, a signal lamp, or another roadside apparatus with a wireless communication function.

The base stations 12 may be network side apparatuses in the wireless communication system. The wireless communication system may be a 4th generation mobile communication (4G) system, also known as a long term evolution (LTE) system; or, the wireless communication system may also be a 5G system, also known as a new radio (NR) system or a 5G NR system. Or, the wireless communication system may also be a next-generation system of the 5G system. An access network in the 5G system may be called a new generation-radio access network (NG-RAN). Or the wireless communication system may also be an MTC system.

The base stations 12 may be evolved base stations (eNBs) adopted in the 4G system. Or, the base stations 12 may also be base stations adopting a central and distributed architecture (gNBs) in the 5G system. When each base station 12 adopts the central and distributed architecture, each base station usually includes a central unit (CU) and at least two distributed units (DUs). Each central unit is provided with protocol stacks of a packet data convergence protocol (PDCP) layer, a radio link control (RLC) protocol layer, and a media access control (MAC) layer; each distributed unit is provided with a physical (PHY) layer protocol stack. The examples of the disclosure does not limit the specific implementations of the base stations 12.

Wireless connection may be established between each base station 12 and the corresponding terminal 11 through a wireless air interface. In different implementations, the wireless air interface is a wireless air interface based on a 4G standard; or, the wireless air interface is a wireless air interface based on a 5G standard, for example, the wireless air interface is a new air interface; or, the wireless air interface may also be a wireless air interface based on a standard of a next-generation mobile communication network technology of the 5G.

In some examples, end to end (E2E) connection may also be established between the terminals 11, for example, vehicle to vehicle (V2V) communication, vehicle to infrastructure (V2I) communication, and vehicle to pedestrian (V2P) communication in vehicle to everything (V2X), and other scenes.

In some examples, the above-mentioned wireless communication system may further include a network management apparatus 13.

The plurality of base stations 12 are each connected to the network management apparatus 13. The network management apparatus 13 may be a core network apparatus in the wireless communication system. For example, the network management apparatus 13 may be a mobility management entity (MME) in an evolved packet core (EPC). Or, the network management apparatus may also be other core network apparatus, such as a serving gateway (SGW), a public data network gateway (PGW), and a policy and charging rules function unit (PCRF) or a home subscriber server (HSS), etc. The implementation forms of the network management apparatus 13 are not limited in the examples of the disclosure.

Figure 2:
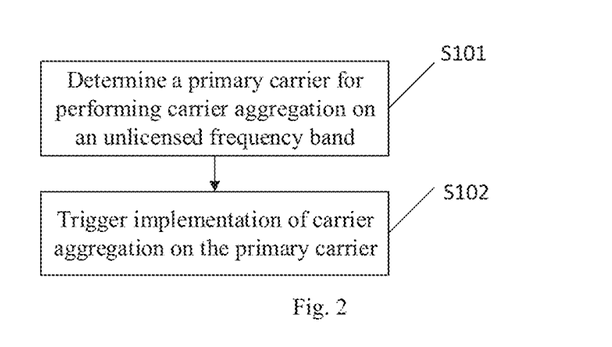
FIG. 2 is a schematic flowchart of a method for carrier aggregation provided by an example of the present application.

As shown in FIG. 2, an example of the present application provides a method for carrier aggregation, including:

step S101: a primary carrier for performing carrier aggregation on an unlicensed frequency band is determined; and step S102: implementation of carrier aggregation is triggered on the primary carrier.

In the present example, the method for carrier aggregation is provided, and is applied to various communication apparatuses. For example, the method for carrier aggregation is applied to a sending end that needs to use a carrier aggregation technology for sending data.

Carriers aggregated during carrier aggregation may be divided into a primary carrier and secondary carriers.

The primary carrier is a carrier relative to the secondary carriers. In addition to transmitting data, the primary carrier also transmits control signaling related to carrier aggregation, for example, control signaling for controlling the start and end of carrier aggregation, and control instructions for scheduling data transmission on the secondary carriers. The control signaling may further include: other carrier aggregation parameters for controlling carrier aggregation. For example, the carrier aggregation parameters are configured to indicate at least one of the following but not limited to: a frame format, a subframe format, etc. used when the carrier aggregation technology is adopted to transmit data. For another example, the control signaling related to carrier aggregation may further include: a control instruction that instructs a terminal to perform channel detection on the secondary carriers.

In other examples, the primary carrier may also be configured to transmit other control signaling that is not related to carrier aggregation.

In some examples, the primary carrier may further be configured to transmit feedback information. For example, the primary carrier may further be configured to transmit hybrid automatic repeat request (HARQ) feedback of data transmitted by carrier aggregation; and the HARQ feedback includes HARQ feedback of data transmitted by the primary carrier, and/or HARQ feedback of data transmitted by the secondary carriers. The HARQ feedback includes, but is limited to: an acknowledgement character (ACK) indicating successful data transmission and/or a non acknowledgement character (NACK) indicating failed data transmission.

The secondary carriers may also be referred to as secondary carriers. In the present example, the secondary carriers mainly assist transmission of the primary carrier.

In the present example, the frequency band used for carrier aggregation is the unlicensed frequency band. The primary carrier and at least one secondary carrier for carrier aggregation are from the unlicensed frequency band.

In the present example, carrier aggregation on the unlicensed frequency band may be divided into dual-carrier aggregation and multi-carrier aggregation according to the quantity of carrier aggregation, and multi-carrier aggregation achieves aggregation of more than two carriers. For example, dual-carrier aggregation will use one primary carrier and one secondary carrier; and multi-carrier aggregation will use one primary carrier and two or more secondary carriers.

In the present example, according to frequency point distribution of the aggregated carriers, the carrier aggregation on the unlicensed frequency band may include:
  continuous carrier aggregation in the same frequency band of the unlicensed frequency band;
  discontinuous carrier aggregation in the same frequency band of the unlicensed frequency band; and
  inter-band carrier aggregation of different frequency bands of the unlicensed frequency band.

Figure 3:
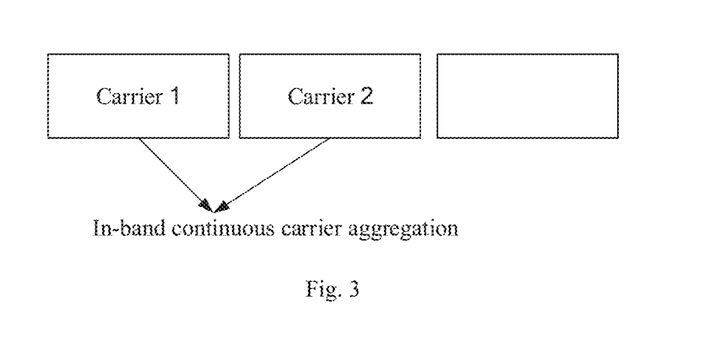
FIG. 3 is a schematic diagram of in-band continuous carrier aggregation provided by an example of the present application.

Referring to FIG. 3, a carrier 1 and a carrier 2 are carriers from the same frequency band of the unlicensed frequency band and are continuous in frequency points, which is in-band continuous carrier aggregation.

Figure 4:
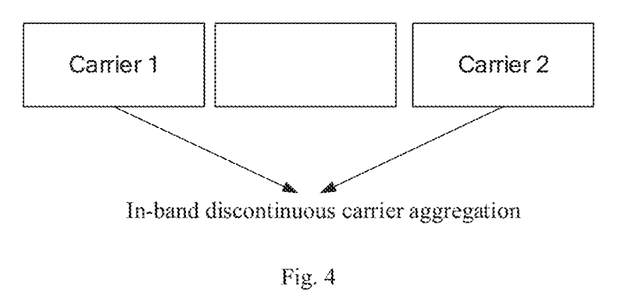
FIG. 4 is a schematic diagram of in-band discontinuous carrier aggregation provided by an example of the present application.

Referring to FIG. 4, a carrier 1 and a carrier 2 are carriers from the same frequency band of the unlicensed frequency band and are discontinuous in frequency points, which is in-band discontinuous carrier aggregation.

Figure 5:
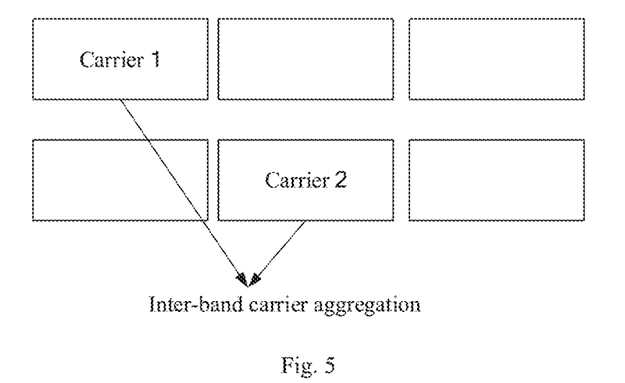
FIG. 5 is a usage diagram of inter-band carrier aggregation provided by an example of the present application.

Referring to FIG. 5, a carrier 1 and a carrier 2 are carriers from different frequency bands of the unlicensed frequency band, which is inter-band carrier aggregation. Since the carrier 1 and the carrier 2 are from different frequency bands, and frequency point ranges corresponding to different frequency bands are different, so the carrier 1 and the carrier 2 are another type of discontinuous carrier aggregation.

In the present example, the control signaling transmitted on the primary carrier may further include indication information such as the quantity of carriers for carrier aggregation and/or frequency points of the carriers.

The unlicensed frequency band may be considered as a public frequency band, and a communication apparatus uses the unlicensed frequency band for data transmission based on a competition mechanism. Before using the unlicensed frequency band, a channel detection technology may be used to monitor the unlicensed frequency band, and the unlicensed frequency band may be competed based on a monitoring result.

For example, there are the following unlicensed frequency bands in 5G New Radio (NR): a 5G NR technology includes LTE-WLAN aggregation (LWA), LTE unlicensed (LTE-U), licensed-assisted access (LAA) and other frequency bands.

In the present example, before performing operation of carrier aggregation, the primary carrier is determined first. Then the implementation of carrier aggregation is triggered on the primary carrier.

The step S102 may include: a notification or instruction for performing carrier aggregation is sent on the primary carrier, so that both a receiving end and a sending end know that carrier aggregation transmission is currently started.

Carrier aggregation in the examples of the present application is performed on the unlicensed frequency band, rather than being limited to a licensed frequency band. In this way, compared with carrier aggregation based on licensed carriers, frequency bands for carrier aggregation are enlarged, and the problems of fewer opportunities and higher failure rate for carrier aggregation caused by less frequency bands used for carrier aggregation due to the limitation of the licensed frequency bands are reduced. In addition, the examples of the present application also regulate the way of performing carrier aggregation on the unlicensed frequency band. Triggering the implementation of carrier aggregation is realized by instructions or notifications transmitted on the primary carrier. In this way, once the primary carrier is determined, an instruction of whether to perform carrier aggregation may be obtained in time through monitoring of the primary carrier, the problem of poor reception effect due to carrier aggregation notifications or instructions not being transmitted in time is solved, and the effect of using the carrier aggregation technology for data transmission is improved.

the primary carrier for performing carrier aggregation on the unlicensed frequency band is determined according to pre-configured carrier information.

In the present example, a network side apparatus such as a base station may pre-configure the carrier information for carrier aggregation, and the carrier information includes a carrier identifier of the primary carrier and so on. In the present example, the sending end may determine the primary carrier for performing carrier aggregation on the unlicensed frequency band according to the pre-configured carrier information.

For example, the base station may pre-configure the carrier information that the terminal may use for carrier aggregation. In this way, the terminal may know the primary carrier for performing carrier aggregation on the unlicensed frequency band according to the carrier information.

For example, after the base station completes configuration of the carrier information, the base station will send the carrier information to the terminal by using the licensed frequency band or the unlicensed frequency band. For example, the base station may use physical layer signaling or high-layer signaling to send the carrier information to the terminal. The physical layer signaling includes, but is not limited to, downlink control information (DCI) issued by using a physical downlink control channel (PDCCH), etc. The high-layer signaling includes, but is not limited to, medium access control (MAC) signaling or radio resource control (RRC) signaling.

The carrier information is carried and sent to the terminal through various control signaling on the licensed frequency band or the unlicensed frequency band, so that the terminal can easily determine the primary carrier for performing carrier aggregation on the unlicensed frequency band according to the carrier information.

The signaling for issuing the carrier information by the base station may include: broadcast signaling, multicast signaling, or unicast signaling.

In the present example, the carrier information includes: information indicating a carrier aggregation relationship for carrier aggregation. The carrier aggregation relationship may at least be configured to represent the primary carrier and the secondary carriers for carrier aggregation.

In some examples, the method further includes:
  channel detection is performed on the primary carrier; or
  channel detection is performed on the main carrier and the secondary carriers.

In the present example, before determining carrier aggregation, channel detection for the carriers may be performed.

In some embodiments, channel detection is performed on the primary carrier, for example, channel monitoring is performed on the primary carrier.

In one example, channel detection is performed on the primary carrier, and channel detection is not performed on the secondary carriers; when it is detected that the primary carrier is idle, if the operation for carrier aggregation needs to be performed, the operation for carrier aggregation may be triggered on the primary carrier; and then the step S102 is performed to trigger the implementation of carrier aggregation.

In another example, the end that performs channel detection will perform channel detection on the primary carrier and at least one secondary carrier. For example, channel detection is performed on the primary carrier and all the secondary carriers. For another example, channel detection is performed on the primary carrier and part of the secondary carriers.

After the channel detection is completed, according to a detection result of the channel detection, whether to perform carrier aggregation, the time to perform carrier aggregation, and other carrier aggregation parameters related to carrier aggregation are determined.

In some examples, the step S102 may include:
the implementation of carrier aggregation is triggered on the primary carrier when it is detected that the primary carrier is idle.

In the present example, when the primary carrier is subjected to channel detection (for example, the primary carrier is idle at the current moment), the implementation of carrier aggregation is triggered on the primary carrier, and the triggering of the implementation of carrier aggregation herein includes: the notifications and instructions for performing carrier aggregation are sent.

In some examples, the method further includes:
when a sending end is a terminal, the terminal reports, to the base station, the detection result of performing channel detection; and
the step S102, includes:
an implementation instruction for triggering the implementation of carrier aggregation and issued by the base station based on the detection result is received on the primary carrier.

In the present example, if the sending end with data to be sent is the terminal, the terminal will report the detection result of channel detection performed on the primary carrier to the base station, or the terminal will report the detection result of channel detection performed on the primary carrier and the secondary carriers to the base station.

In this way, after receiving the detection result, the base station decides whether to perform carrier aggregation and/or determine the carrier aggregation parameters for carrier aggregation. The carrier aggregation parameters include: time parameters for carrier aggregation, frequency parameters for carrier aggregation, the quantity of carriers for carrier aggregation, mode parameters for carrier aggregation, and the like.

When performing carrier aggregation, the terminal will receive the implementation instruction for triggering the implementation of carrier aggregation and issued by the base station on the primary carrier.

Upon receiving the implementation instruction, the terminal may activate carrier aggregation function according to the implementation instruction and/or carrier information for carrier aggregation.

In some examples, the method further includes:
when the sending end is the terminal, the terminal receives the carrier information issued by the base station; and
the step S101 may include:
the terminal determines the primary carrier for performing carrier aggregation on the unlicensed frequency band according to the carrier information issued by the base station.

If the sending end is the terminal, the terminal receives the carrier information issued by the base station, and the carrier information may be carried in various signaling or messages issued by the base station, for example, the carrier information may be carried in broadcast information, a multicast message, or unicast information of the licensed frequency band provided in the above-mentioned example.

In this way, in the step S101, the terminal determines the primary carrier for performing carrier aggregation on the unlicensed frequency band according to the carrier information received from the base station.

Figure 6:
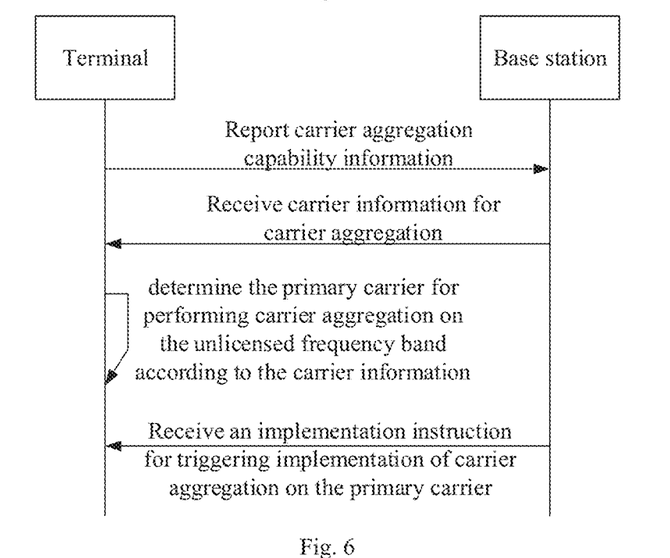
FIG. 6 is a schematic flowchart of another method for carrier aggregation provided by an example of the present application.

In some examples, as shown in FIG. 6, the method further includes:
carrier aggregation capability information of the terminal is reported to the base station; and
said receiving the carrier information for carrier aggregation issued by the base station, includes:
the carrier information issued by the base station based on the carrier aggregation capability information is received.

The terminal will also send own carrier aggregation capability information to the base station in advance for the base station to determine whether to allow the terminal to perform carrier aggregation and/or how to perform carrier aggregation.

In some examples, the terminal may report the carrier aggregation capability information to the base station on the licensed frequency band or the unlicensed frequency band. In an embodiment, the terminal may report the carrier aggregation capability information through an uplink channel of the licensed frequency band. For example, the terminal may report the carrier aggregation capability information through a physical uplink control channel (PUCCH) of the licensed frequency band.

In some examples, the terminal reports the carrier aggregation capability information in the process of establishing RRC connection with the base station. For instance, the base station issues an RRC connection establishment message; after receiving the RRC connection establishment message, the terminal returns a RRC connection establishment complete message to the base station; the RRC connection establishment complete message may carry the carrier aggregation capability information, so that in the process that the terminal and the base station complete the establishment of the RRC connection, the reporting of the carrier aggregation capability information is synchronously completed; and in this way, there is no need to introduce additional signaling to report the carrier aggregation capability information.

In other examples, the terminal may actively report the carrier aggregation capability information after completing the establishment of the RRC connection with the base station.

In other examples, when the RRC connection between the terminal and the base station is re-established, the carrier aggregation capability information may be carried in an RRC connection reconfiguration complete message to be sent and reported to the base station.

After receiving the carrier aggregation capability information, the base station may perform configuration according to the carrier aggregation capability information of the terminal to adapt to the carrier aggregation capability of the terminal; and carrier aggregation failure phenomenon caused by mismatch between configured carrier information and the carrier aggregation capability of the terminal is reduced.

In some examples, the carrier aggregation capability information is configured to indicate at least one of the following:
whether the terminal supports carrier aggregation on the unlicensed frequency band or not; or
the maximum carrier aggregation quantity supported by the terminal.

In some examples, the carrier aggregation capability information may further be configured to indicate: whether the terminal supports carrier aggregation on the licensed frequency band or not; or, whether the terminal supports carrier aggregation.

As long as the terminal supports carrier aggregation on the unlicensed frequency band, the steps S101 to S102 are performed.

For the maximum carrier aggregation quantity supported by the terminal, for example, some terminals only support dual-carrier aggregation, while some terminals may support carrier aggregation of two or more carriers.

When configuring the carrier information for carrier aggregation for the terminal, the quantity of carriers for carrier aggregation indicated by the carrier information does not exceed the maximum carrier aggregation quantity supported by the terminal.

In some examples, the carrier aggregation capability information may further be configured to indicate a frequency point interval between carriers for carrier aggregation supported by the terminal.

In some examples, the step S101 may include: the primary carrier is determined according to dynamically determined carrier information.

In the above-mentioned examples, the carrier information is pre-configured. In the present example, the carrier information may be dynamically determined.

In this way, in step S101, the primary carrier may be determined according to the dynamically determined carrier information.

In an embodiment, channel detection is performed on at least one or more carriers in the unlicensed frequency band, and when it is detected that at least one carrier is idle, the earliest detected idle carrier may be taken as the primary carrier for performing carrier aggregation. After the primary carrier is determined, a carrier identifier of the carrier will be written into the carrier information as a primary carrier identifier.

In the present example, the carrier information for carrier aggregation is dynamically determined, which is equivalent to dynamically determining the primary carrier for carrier aggregation; in this way, relevant information for carrier aggregation may be dynamically and flexibly configured according to the idle and busy status of the carrier on the unlicensed frequency band; and in this way, compared with static configuration, the quantity of operations and the success rate of carrier aggregation can be increased.

In some examples, the method further includes:
when the sending end is the base station, the base station performs channel detection on a carrier of the unlicensed frequency band; and
the base station takes the earliest detected idle carrier as the primary carrier indicated by the dynamically determined carrier information.

If channel detection is performed by the base station, the base station will perform channel detection on a plurality of carriers of the unlicensed frequency band, and then takes the earliest detected idle carrier as the primary carrier, and generates and determines the carrier information based on the determined primary carrier.

In the present example, the earliest detected idle carrier is taken as the primary carrier, so that carrier aggregation is implemented as quickly as possible, the time delay of carrier aggregation is reduced, and the phenomenon of low transmission efficiency caused by the late start time of carrier aggregation is reduced. In some examples, the step S102 may include: an implementation instruction for triggering the implementation of carrier aggregation is sent to the terminal on the primary carrier after the primary carrier is determined.

After determining the primary carrier, if the base station determines that carrier aggregation needs to be performed, the implementation instruction for triggering the implementation of carrier aggregation will be sent to the terminal on the primary carrier. In this way, the terminal performs the operation for carrier aggregation upon receiving the implementation instruction.

In some examples, the method further includes:
when the sending end is the terminal, the terminal performs channel detection on the carrier of the unlicensed frequency band to obtain a detection result; and
the detection result is reported to the base station, the detection result being configured for the base station to determine the primary carrier.

When the sending end is the terminal, the terminal performs channel detection on the carrier of the unlicensed frequency band to obtain the detection result, the detection result is reported to the base station, and the base station finally determines the selection of the primary carrier and/or decides whether to perform carrier aggregation.

For example, the base station may dynamically determine the carrier information according to the detection result.

In the examples of the present application, the carrier information is configured to indicate at least one of the following:
the primary carrier;
a carrier bandwidth;
a frequency point of the primary carrier; or
a frequency point of each secondary carrier.

The carrier information may include: a carrier identifier indicating the primary carrier, bandwidth information indicating the carrier bandwidth, frequency point information indicating the frequency point corresponding to the primary carrier and/or the secondary carriers, etc.

Figure 10:
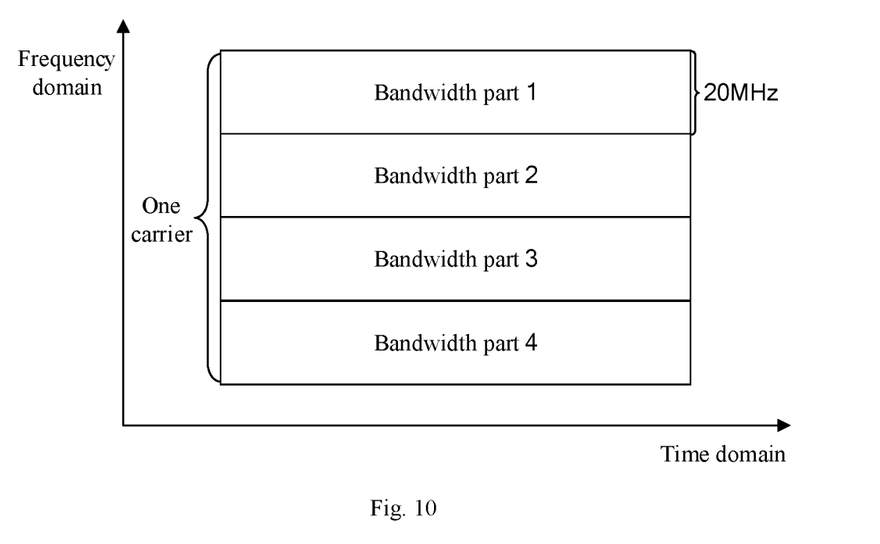
FIG. 10 is a schematic diagram of a bandwidth of a carrier provided by an example of the present application.

In some cases, the maximum bandwidth of one carrier is 20 MHz; and in some cases, the maximum bandwidth of one carrier may reach 80 MHz. FIG. 10 shows a carrier with a bandwidth of 80 MHz, the carrier is divided into 4 bandwidth parts, namely, a bandwidth part 1, a bandwidth part 2, a bandwidth part 3, and a bandwidth part 4, and each bandwidth part is 20 MHz.

Figure 7:
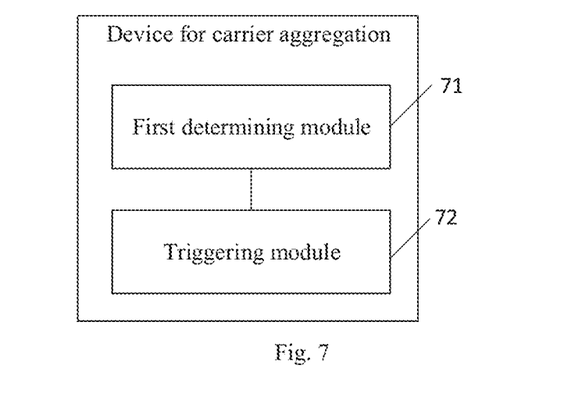
FIG. 7 is a schematic structural diagram of a device for carrier aggregation provided by an example of the present application.

As shown in FIG. 7, the present example provides a device for carrier aggregation, including:
a first determining module 71, configured to determine a primary carrier for performing carrier aggregation on an unlicensed frequency band; and
a triggering module 72, configured to trigger implementation of carrier aggregation on the primary carrier.

In the present example, the first determining module 71 and the triggering module 72 may be program modules. After the program modules are executed by a processor, the determination of the primary carrier and the implementation of carrier aggregation may be realized.

In other examples, the first determining module 71 and the triggering module 72 may be software and hardware combined modules, which may be various programmable arrays;

and the programmable arrays include, but are not limited to, complex programmable arrays and field programmable arrays.

In some other examples, the first determining module 71 and the triggering module 72 may be pure hardware modules; and the pure hardware modules include, but are not limited to, application specific integrated circuits.

In some examples, the determining module is configured to determine the primary carrier for performing carrier aggregation on the unlicensed frequency band according to pre-configured carrier information.

In some examples, the device further includes:
a first detecting module, configured to perform channel detection on the primary carrier; or
a second detecting module, configured to perform channel detection on the primary carrier and secondary carriers.

In some other examples, the triggering module 72 is configured to trigger the implementation of carrier aggregation on the primary carrier when it is detected that the primary carrier is idle.

In some other examples, the device further includes:
a first reporting module, configured to report, by a terminal, a detection result of performing channel detection to a base station when a sending end is the terminal; and
the triggering module 72 is configured to receive, on the primary carrier, an implementation instruction for triggering the implementation of carrier aggregation and issued by the base station based on the detection result.

In some other examples, the device further includes:
a first receiving module, configured to receive, by the terminal, carrier information issued by the base station when the sending end is the terminal; and
the triggering module 72 is configured to determine, by the terminal, the primary carrier for performing carrier aggregation on the unlicensed frequency band according to the carrier information issued by the base station.

In some other examples, the device further includes:
a second reporting module, configured to report carrier aggregation capability information of the terminal to the base station; and
the first receiving module is configured to receive the carrier information issued by the base station based on the carrier aggregation capability information.

In some other examples, the carrier aggregation capability information is configured to indicate at least one of the following:
whether the terminal supports carrier aggregation on the unlicensed frequency band or not; or
the maximum carrier aggregation quantity supported by the terminal.

In some other examples, the first determining module 71 is configured to determine the primary carrier according to dynamically determined carrier information.

In some other examples, the device further includes:
a third detecting module, configured to perform, by the base station, channel detection on a carrier of the unlicensed frequency band when the sending end is the base station; and
a second determining module, configured to take, by the base station, an earliest detected idle carrier as the primary carrier indicated by the dynamically determined carrier information.

In some other examples, the triggering module 72 is configured to send, on the primary carrier, the implementation instruction for triggering the implementation of carrier aggregation to the terminal after the primary carrier is determined.

In some other examples, the device further includes:
a fourth detecting module, configured to perform, by the terminal, channel detection on the carrier of the unlicensed frequency band to obtain the detection result when the sending end is the terminal; and
a third reporting module, configured to report the detection result to the base station, the detection result being configured for the base station to determine the primary carrier.

In some other examples, the carrier information is configured to indicate at least one of the following:
the primary carrier;
a carrier bandwidth;
a frequency point of the primary carrier; or
a frequency point of each secondary carrier.

Several specific examples are provided below in conjunction with any of the above-mentioned examples:

Example 1

The present application provides a method for implementing carrier aggregation on an unlicensed frequency band, which can effectively support the transmission of services with relatively high data rate requirements on the unlicensed frequency band.

The method provided by the present application is as follows:

The terminal reports own carrier aggregation capability information. The carrier aggregation capability information indicates the carrier aggregation capability of the terminal. For example, the carrier aggregation capability information is configured to at least indicate: whether the terminal supports carrier aggregation on an unlicensed spectrum, the maximum carrier aggregation quantity supported by the terminal, and other information.

The terminal may report the carrier aggregation capability information on a licensed frequency band or the unlicensed frequency band. For example, the terminal may report the capability in the process of establishing the RRC connection or in the communication process with the base station after the RRC connection is established.

A carrier aggregation relationship may be pre-configured or dynamically determined; and if the carrier aggregation relationship is pre-configured, the above-mentioned carrier information may be pre-configured and formed.

In the case of pre-configuring the carrier aggregation relationship, when the terminal has the capability to perform carrier aggregation on the unlicensed frequency band, the base station will pre-configure the carrier information that the terminal may use for carrier aggregation, and the carrier information may be configured to indicate at least one of the following:
the primary carrier, the carrier bandwidth, the frequency points corresponding to carriers participating in carrier aggregation, and other information.

When the sending end operates on the unlicensed spectrum, the modes for carrier aggregation may include, but are not limited to, the following:

A first type: operations such as channel detection are performed on the carrier that may be used as the primary carrier, after the primary carrier is determined, the operations on the secondary carriers, such as channel access mechanisms and notifications for some control information, may be controlled through the primary carrier.

A second type: channel detection is performed on all carriers, and when the carrier that may operate is a secondary carrier, the operation of carrier aggregation cannot be performed.

For the first type: when channel detection is only performed on the primary carrier, the sending end (such as the base station or the terminal) may also perform channel detection on a carrier 1 first. If it is detected that the corresponding carrier is idle, the idle carrier is occupied for carrier aggregation. After the carrier 1 is successfully occupied, the operations on a carrier 2 and a carrier 3 are indicated.

Figure 8:
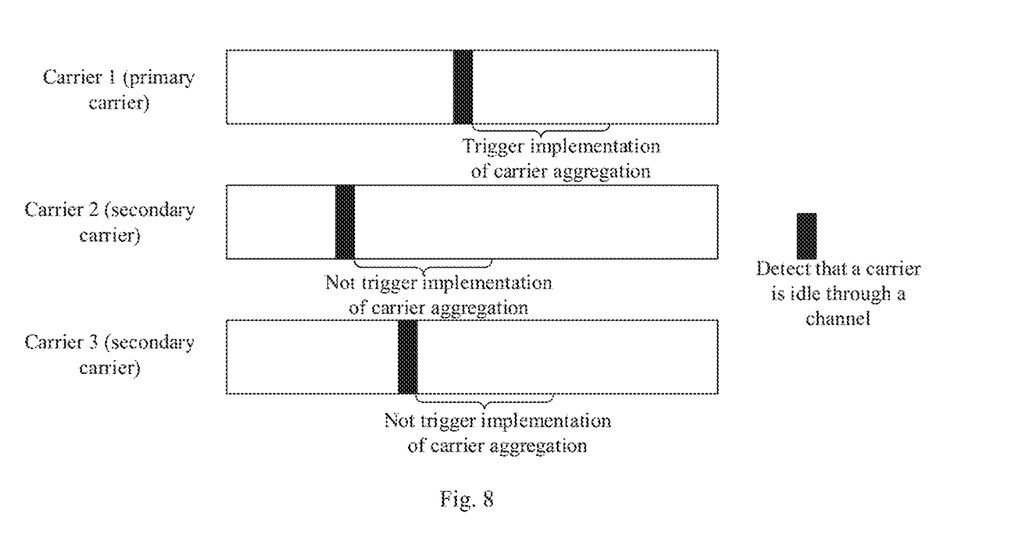
FIG. 8 is a schematic diagram of channel detection of a pre-configured carrier aggregation relationship provided by an example of the present application.

For the second type: when channel detection is performed on all the carriers, as shown in FIG. 8, when the sending end is the base station, the base station pre-determines the carrier 1 as the primary carrier for the operation of carrier aggregation, and the carrier 2 and the carrier 3 as the secondary carriers for the operation of carrier aggregation.

The base station may perform channel detection on all of the carrier 1, the carrier 2, and the carrier 3. When the base station detects that the carrier 2 or the carrier 3 is idle, the base station may perform data transmission on the carrier 2 and the carrier 3, but cannot trigger operation of carrier aggregation on the carrier 2 and the carrier 3. When it is detected that the carrier 1 is idle, the carrier 1 is occupied, and the implementation of carrier aggregation may be triggered on the carrier 1 to aggregate the idle carrier 2 and/or carrier 3. In the same way, when the sending end is the terminal, the terminal receives an instruction from the base station to predetermine the carrier 1 as the primary carrier for the operation of carrier aggregation, and the carrier 2 and the carrier 3 as the secondary carriers for the operation of carrier aggregation. The terminal performs channel detection on all of the carrier 1, the carrier 2, and the carrier 3 and notifies the base station of the detection result. The base station decides whether to trigger the implementation of carrier aggregation based on the detection result.

Example 2

In the case of dynamically determining the carrier aggregation relationship, when the terminal has the capability to perform carrier aggregation on the unlicensed frequency band, the base station will perform channel detection operations on all the carriers, and when a channel is successfully occupied on a certain carrier, the terminal may be triggered to perform carrier aggregation on the carrier.

The operations that trigger the terminal to perform carrier aggregation may include, but are not limited to:
notifying the terminal of information related to aggregated carriers; and
channel access mechanisms on the secondary carriers, transmission of control information, etc.

Figure 9:
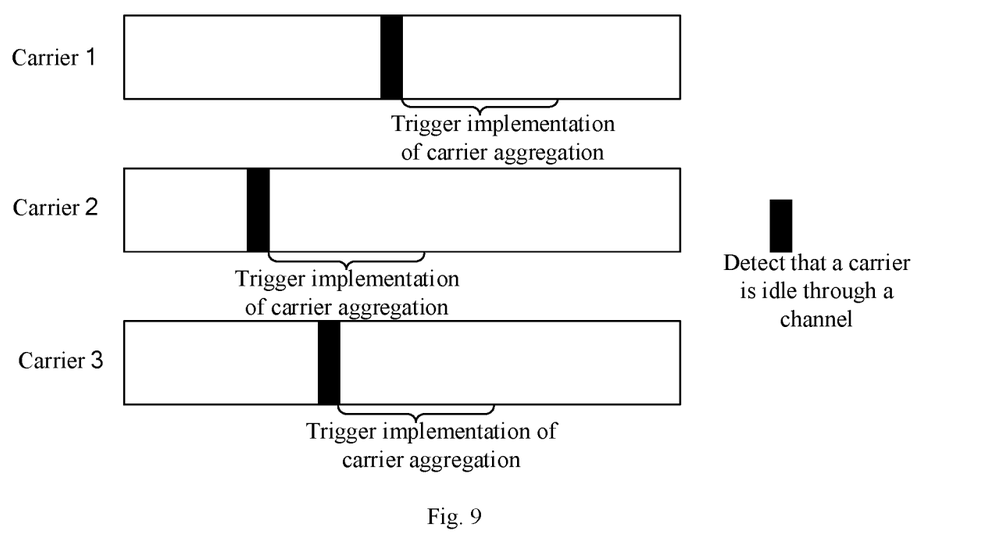
FIG. 9 is a schematic diagram of channel detection of a pre-dynamically determined carrier aggregation relationship provided by an example of the present application.

As shown in FIG. 9, when the sending end passes channel detection on any carrier, it is determined that the carrier is the primary carrier, and the operation of carrier aggregation may be triggered and implemented on the primary carrier. The present application provides the method for implementing carrier aggregation on the unlicensed frequency band, which can effectively support the transmission of services with relatively high data rate requirements on the unlicensed frequency band.

When the sending end (the base station or the terminal) performs channel detection on the carrier 1, the carrier 2, and the carrier 3 of the unlicensed frequency band respectively, if an idle carrier is detected, the idle carrier may be taken as the primary carrier to trigger the implementation of carrier aggregation. In the present example, the earliest detected idle carrier is taken as the primary carrier to trigger the implementation of carrier aggregation. For example, in FIG. 10, the earliest detected idle carrier is the carrier 2, and the base station will configure the carrier 2 as the primary carrier for performing carrier aggregation to form the dynamically determined carrier information.

In this way, compared to the pre-configured carrier 1 shown in FIG. 8 as the primary carrier, when the idle conditions of the carrier 1, the carrier 2 and the carrier 3 are the same, because the carrier information is configured in different ways, the start time of carrier aggregation is different and the primary carrier used is different.

The present example further provides a communication apparatus, including:
an antenna;
a memory; and
a processor, configured to connect with the antenna and the memory respectively, and to control the antenna to send and receive wireless signals by executing an executable program stored on the memory, and to implement steps of the method for carrier aggregation provided by any of the above-mentioned examples.

The communication apparatus provided in the present example may be the above-mentioned terminal or base station. The terminal may be various human-borne terminals or on-board terminals. The base station may be various types of base stations, for example, 4G base stations or 5G base stations.

The antenna may be various types of antennas, for example, a mobile antenna such as a 3G antenna, a 4G antenna, or a 5G antenna; and the antenna may further include a WiFi antenna or a wireless charging antenna.

The memory may include various types of storage media, which are non-transitory computer storage media that may continue to memorize and store information thereon after the communication apparatus is powered off.

The processor may be connected to the antenna and the memory through a bus or the like, and configured to read an executable program stored on the memory and to implement, for example, the method for carrier aggregation shown in FIG. 2 and/or FIG. 6.

An example of the present application also provides a non-transitory computer-readable storage medium, which has an executable program stored thereon. When the executable program is executed by a processor, steps of the method for carrier aggregation provided by any above-mentioned example are implemented, for example, at least one of the methods shown in FIG. 2 and/or FIG. 6.

Figure 11:
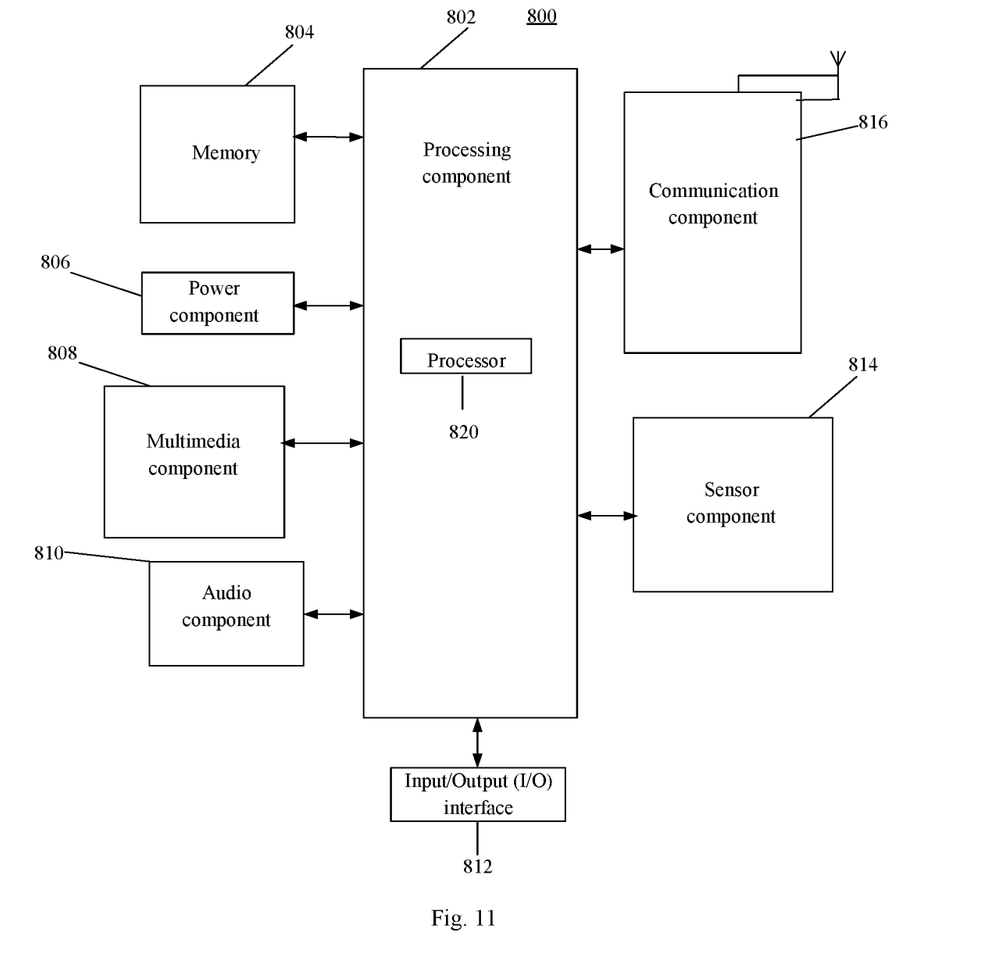
FIG. 11 is a schematic structural diagram of a terminal provided by an example of the present application.

Referring to a terminal 800 shown in FIG. 11, an example provides a terminal 800. The terminal may be a mobile phone, a computer, a digital broadcast terminal, a messaging device, a gaming console, a tablet, a medical device, exercise equipment, a personal digital assistant, and the like.

Referring to FIG. 11, the terminal 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the terminal 800, such as operations associated with display, telephone calls, data communications, camera operations, and recording operations. The processing component 802 may include one or more processors 820 to execute instructions to complete all or part of the steps of the method described above. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support operations at the terminal 800. Examples of such data include instructions for any applications or methods operated on the terminal 800, contact data, phonebook data, messages, pictures, video, etc. The memory 804 may be implemented by any type of volatile or non-volatile memory devices or combinations thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or a compact disk.

The power component 806 provides power for various components of the terminal 800. The power component 806 may include a power management system, one or more power sources, and any other components associated with the generation, management and distribution of power for the terminal 800.

The multimedia component 808 includes a screen providing an output interface between the terminal 800 and a user. In some examples, the screen may include a liquid crystal display (LCD) and a touch panel (TP). If the screen includes the TP, the screen may be implemented as a touch screen to receive an input signal from a user. The touch panel includes one or more touch sensors to sense touch, swipe, and gestures on the touch panel. The touch sensors may not only sense a boundary of a touch or swipe action, but also detect duration and pressure related to the touch or swipe operation. In some examples, the multimedia component 808 includes a front camera and/or a rear camera. The front camera and/or the rear camera may receive external multimedia data when the terminal 800 is in an operation mode, such as a photographing mode or a video mode. Each front camera and each rear camera may be fixed optical lens systems or may have focal lengths and optical zoom capabilities.

The audio component 810 is configured to output and/or input audio signals. For example, the audio component 810 includes a Microphone (MIC) configured to receive an external audio signal when the terminal 800 is in an operation mode, such as a call mode, a recording mode, and a voice recognition mode. The received audio signals may be further stored in the memory 804 or sent via the communication component 816. In some examples, the audio component 810 further includes a speaker configured to output audio signals.

The I/O interface 812 provides an interface between the processing component 802 and peripheral interface modules, such as a keyboard, a click wheel, or buttons. These buttons may include, but not limited to: a home button, a volume button, a start button, and a lock button.

The sensor component 814 includes one or more sensors configured to provide status assessments of various aspects of the terminal 800. For example, the sensor component 814 may detect an opened/closed state of the terminal 800 and the relative positioning of the components such as a display and a keypad of the terminal 800, and the sensor component 814 may also detect the position change of the terminal 800 or a component of the terminal 800, the presence or absence of contact between a user and the terminal 800, the orientation or acceleration/deceleration of the terminal 800, and the temperature change of the terminal 800. The sensor component 814 may include a proximity sensor configured to detect the existence of nearby objects under the situation of no physical contact. The sensor component 814 may further include an optical sensor, such as a CMOS or CCD image sensor, for use in an imaging application. In some examples, the sensor component 814 may further include an accelerometer sensor, a gyroscope sensor, a magnetic sensor, a pressure sensor, or a temperature sensor.

The communication component 816 is configured to facilitate wired or wireless communication between the terminal 800 and other devices. The terminal 800 may access a wireless network based on a communication standard, such as WiFi, 2G or 3G, or combinations thereof. In one example, the communication component 816 receives broadcast signals or broadcast related information from an external broadcast management system via a broadcast channel In one example, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wideband (UWB) technology, a Bluetooth (BT) technology and other technologies.

In the examples, the terminal 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for executing the above-described method.

In the examples, a non-transitory computer-readable storage medium including instructions is further provided, such as the memory 804 including the instructions. The instructions may be executed by the processor 820 in the terminal 800, for executing the above-described method. For example, the non-transitory computer-readable storage medium may be a Read Only Memory (ROM), a Random Access Memory (RAM), a Compact Disc Read Only Memory (CD-ROM), a magnetic tape, a floppy disk, an optical data storage device, and the like.

The terminal may be configured to implement the above-mentioned method for carrier aggregation, for example, the method for carrier aggregation as described in FIG. 2 and/or FIG. 6.

Figure 12:
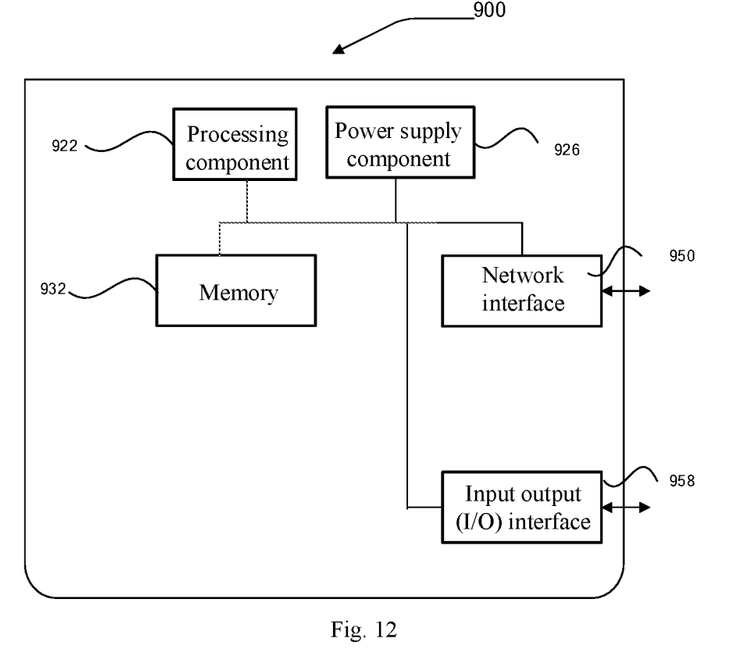
FIG. 12 is a schematic structural diagram of a base station provided by an example of the present application.

FIG. 12 is a block diagram illustrating a base station 900 according to an example. For example, the base station 900 may be provided as a network side apparatus. Referring to FIG. 12, the base station 900 includes a processing component 922, which further includes one or more processors, and a memory resource represented by a memory 932, configured to store instructions that may be executed by the processing component 922, such as an application program. The application program stored in the memory 932 may include one or more modules each corresponding to a set of instructions. In addition, the processing component 922 is configured to execute the instructions to execute the method for carrier aggregation provided by any of the above-mentioned examples, for example, the method shown in FIG. 2 and/or FIG. 6.

The base station 900 may further include a power supply component 926 configured to perform power management of the base station 900, a wired or wireless network interface 950 configured to connect the base station 900 to a network, and an input output (I/O) interface 958. The base station 900 may operate an operating system stored in the memory 932, such as Windows Server™, Mac OS X™, Unix™, Linux™, FreeBSD™ or the like.

The wireless network interface 950 includes, but is not limited to, the antenna of the above-mentioned communication apparatus. Other examples of the application will be apparent to those skilled in the art from consideration of the specification and practice of the disclosure herein. The application is intended to cover any variations, uses, or adaptations of the application following the general principles thereof and including such departures from the disclosure as come within known or customary practice in the art. It is intended that the specification and examples be considered as exemplary only, with a true scope and spirit of the application being indicated by the following claims.

According to the technical solutions provided by the examples of the present application, carrier aggregation in the examples of the present application is performed on the unlicensed frequency band, rather than being limited to a licensed frequency band. In this way, compared with carrier aggregation based on licensed carriers, frequency bands for carrier aggregation are enlarged, and the problems of fewer opportunities and higher failure rate for carrier aggregation caused by less frequency bands used for carrier aggregation due to the limitation of the licensed frequency bands are reduced. In addition, the examples of the present application also regulate the way of performing carrier aggregation on the unlicensed frequency band. Triggering the implementation of carrier aggregation is realized by instructions or notifications transmitted on the primary carrier. In this way, once the primary carrier is determined, an instruction of whether to perform carrier aggregation may be obtained in time through monitoring of the primary carrier, the problem of poor reception effect due to carrier aggregation notifications or instructions not being transmitted in time is solved, and the effect of using the carrier aggregation technology for data transmission is improved.

It should be understood that the application is not limited to the exact construction that has been described above and illustrated in the accompanying drawings, and that various modifications and changes may be made without departing from the scope thereof. It is intended that the scope of the application only be limited by the appended claims.

The invention claimed is:

1. A method for carrier aggregation, comprising:
   determining a primary carrier for performing carrier aggregation on an unlicensed frequency band, wherein the primary carrier is configured to transmit control signaling; and
   triggering implementation of the carrier aggregation on the primary carrier;
   wherein triggering the implementation of the carrier aggregation on the primary carrier comprises transmitting, on the primary carrier, control signaling related on carrier aggregation, and
   wherein triggering the implementation of the carrier aggregation on the primary carrier further comprises triggering the implementation of the carrier aggregation on the primary carrier in response to a detection that the primary carrier is idle.

2. The method according to claim 1, wherein determining the primary carrier for performing the carrier aggregation on the unlicensed frequency band, comprises:
   determining the primary carrier for performing the carrier aggregation on the unlicensed frequency band according to pre-configured carrier information.

3. The method according to claim 2, wherein the method further comprises one of the following:
   performing channel detection on the primary carrier; or
   performing channel detection on the primary carrier and a secondary carrier.

4. The method according to claim 2, wherein the method further comprises:
   receiving, by a terminal, carrier information issued by a base station when a sending end is the terminal; and
   determining the primary carrier for performing the carrier aggregation on the unlicensed frequency band, which comprises:
   determining, by the terminal, the primary carrier for performing the carrier aggregation on the unlicensed frequency band according to the carrier information issued by the base station.

5. The method according to claim 4, wherein the method further comprises:
   reporting, to the base station, carrier aggregation capability information of the terminal; and
   receiving the carrier information for the carrier aggregation issued by the base station, which comprises:
   receiving the carrier information issued by the base station based on the carrier aggregation capability information.

6. The method according to claim 5, wherein the carrier aggregation capability information is configured to indicate at least one of the following:
   whether the terminal supports the carrier aggregation on the unlicensed frequency band or not; and
   a maximum carrier aggregation quantity supported by the terminal.

7. The method according to claim 2, wherein the carrier information is configured to indicate at least one of the following:
   the primary carrier;
   a carrier bandwidth;
   a frequency point of the primary carrier; or
   a frequency point of secondary carrier.

8. The method according to claim 1, wherein the method further comprises:
   reporting, by a terminal, a detection result of performing the channel detection to a base station when a sending end is the terminal; and
   triggering the implementation of the carrier aggregation on the primary carrier, which comprises:
   receiving, on the primary carrier, an implementation instruction for triggering the implementation of the carrier aggregation and issued by the base station based on the detection result.

9. The method according to claim 1, wherein determining the primary carrier for performing the carrier aggregation on the unlicensed frequency band comprises:
   determining the primary carrier according to dynamically determined carrier information.

10. The method according to claim 9, wherein the method further comprises:
    performing, by a base station, channel detection on a carrier of the unlicensed frequency band when a sending end is the base station; and
    taking, by the base station, an earliest detected idle carrier as the primary carrier indicated by the dynamically determined carrier information.

11. The method according to claim 10, wherein triggering the implementation of the carrier aggregation on the primary carrier comprises:

sending, on the primary carrier, an implementation instruction for triggering the implementation of the carrier aggregation to a terminal after the primary carrier is determined.

12. The method according to claim 9, wherein the method further comprises:
performing, by a terminal, channel detection on a carrier of the unlicensed frequency band to obtain a detection result when a sending end is the terminal; and
reporting the detection result to a base station, wherein the detection result is configured for the base station to determine the primary carrier.

13. A communication apparatus, comprising:
an antenna;
a memory; and
a processor, respectively connected with the antenna and the memory, and configured to control the antenna to send and receive wireless signals by executing an executable program stored on the memory, and configured to:
determine a primary carrier for performing carrier aggregation on an unlicensed frequency band, wherein the primary carrier is configured to transmit control signaling; and
trigger implementation of the carrier aggregation on the primary carrier;
wherein triggering the implementation of the carrier aggregation on the primary carrier comprises transmitting, on the primary carrier, control signaling related on carrier aggregation, and
wherein triggering the implementation of the carrier aggregation on the primary carrier further comprises triggering the implementation of the carrier aggregation on the primary carrier in response to a detection that the primary carrier is idle.

14. The communication apparatus according to claim 13, wherein the processor is further configured to determine the primary carrier for performing the carrier aggregation on the unlicensed frequency band according to pre-configured carrier information.

15. The communication apparatus according to claim 14, wherein the processor is further configured to:
perform channel detection on the primary carrier;
or,
perform channel detection on the primary carrier and a secondary carrier.

16. The communication apparatus according to claim 13, wherein the processor is further configured to determine the primary carrier according to dynamically determined carrier information.

17. The communication apparatus according to claim 13, wherein the processor is further configured to:
make a base station perform channel detection on a carrier of the unlicensed frequency band when a sending end is the base station; and
make the base station take an earliest detected idle carrier as the primary carrier indicated by dynamically determined carrier information.

18. A non-transitory computer-readable storage medium having an executable program stored thereon, wherein when the executable program is executed by a processor, the processor performs a method for carrier aggregation, the method comprising:
determining a primary carrier for performing carrier aggregation on an unlicensed frequency band, wherein the primary carrier is configured to transmit control signaling; and
triggering implementation of the carrier aggregation on the primary carrier;
wherein triggering the implementation of the carrier aggregation on the primary carrier comprises transmitting, on the primary carrier, control signaling related on carrier aggregation, and
wherein triggering the implementation of the carrier aggregation on the primary carrier further comprises triggering the implementation of the carrier aggregation on the primary carrier in response to a detection that the primary carrier is idle.

* * * * *